(12) United States Patent
Satorras et al.

(10) Patent No.: US 11,620,517 B2
(45) Date of Patent: Apr. 4, 2023

(54) CONTROL OF A PHYSICAL SYSTEM BASED ON INFERRED STATE

(71) Applicant: Robert Bosch GmbH, Stuttgart (DE)

(72) Inventors: Victor Garcia Satorras, Amsterdam (NL); Max Welling, Bussum (NL); Volker Fischer, Leonberg (DE); Zeynep Akata, Amsterdam (NL)

(73) Assignee: ROBERT BOSCH GMBH, Stuttgart (DE)

( * ) Notice: Subject to any disclaimer, the term of this patent is extended or adjusted under 35 U.S.C. 154(b) by 435 days.

(21) Appl. No.: 16/804,820

(22) Filed: Feb. 28, 2020

(65) Prior Publication Data

US 2020/0285962 A1 Sep. 10, 2020

(30) Foreign Application Priority Data

Mar. 6, 2019 (EP) .................................... 19161069

(51) Int. Cl.
*G06N 3/08* (2023.01)
(52) U.S. Cl.
CPC ...................................... *G06N 3/08* (2013.01)
(58) Field of Classification Search
None
See application file for complete search history.

(56) References Cited

U.S. PATENT DOCUMENTS

| 7,769,703 | B2 | 8/2010 | Calise et al. |
| 2008/0103703 | A1* | 5/2008 | Tichborne ............... G01F 9/008 |
| | | | 702/51 |

FOREIGN PATENT DOCUMENTS

EP 1357487 A2 10/2003

OTHER PUBLICATIONS

G.F. Franklin et al. Digital Control of Dynamic Systems (selected portions). 3rd Edition. 1998. [retrieved on Jul. 1, 2022] <URL:https://www.researchgate.net/publication/31849881_Digital_Control_of_Dynamic_Systems-Third_Edition> (Year: 1998).*

(Continued)

*Primary Examiner* — Bion A Shelden
(74) *Attorney, Agent, or Firm* — Norton Rose Fulbright US LLP; Gerard Messina

(57) ABSTRACT

A system and computer-implemented method are provided for enabling control of a physical system based on a state of the physical system which is inferred from sensor data. The system and method may iteratively infer the state by, in an iteration, obtaining an initial inference of the state using a mathematical model representing a prior knowledge-based modelling of the state, and by applying a learned model to the initial inference of the state and the sensor measurement, wherein the learned model has been learned to minimize an error between initial inferences provided by the mathematical model and a ground truth and to provide a correction value as output for correcting the initial inference of the state of the mathematical model. Output data may be provided to an output device to enable control of the physical system based on the inferred state.

9 Claims, 4 Drawing Sheets

(56) References Cited

OTHER PUBLICATIONS

L. Song et al. Application of Federal Kalman Filter with Neural Networks in the Velocity and Attitude Matching of Transfer Alignment. Hindawi. Jan. 2018. [retrieved on Jul. 1, 2022] <URL:https://downloads.hindawi.com/journals/complexity/2018/3039061.pdf> (Year: 2018).*
S. Duell et al. Solving Partially Observable Reinforcement Learning Problems with Recurrent Neural Networks. 2012. [retrieved on Jul. 1, 2022] <URL:https://link.springer.com/chapter/10.1007/978-3-642-35289-8_38> (Year: 2012).*
H. Zhang. Human Pose Estimation with Spatial Contextual Information. arXiv. Jan. 2019. [retrieved on Jul. 1, 2022] <URL:https://arxiv.org/pdf/1901.01760.pdf> (Year: 2019).*
S. Srihari. RNNs as Directed Graphical Models. [archived on Dec. 9, 2017] [retrieved from archive on Jul. 1, 2022] <URL:https://web.archive.org/web/20171209064015/https://cedar.buffalo.edu/~srihari/CSE676/10.2.3%20RNN-PGM.pdf> (Year: 2017).*
S.C. Stubberud et al. An Adaptive Extended Kalman Filter. 1995. [retrieved from internet on Jul. 1, 2022] <URL: https://ieeexplore.ieee.org/stamp/stamp.jsp?tp=&arnumber=480611> (Year: 1995).*
I. Ullah et al. Improving Accuracy of the Kalman Filter Algorithm in Dynamic Conditions Using ANN-Based Learning Module. Jan. 2019. [retrieved from internet on Jul. 1, 2022] <URL: https://www.mdpi.com/2073-8994/11/1/94> (Year: 2019).*

\* cited by examiner

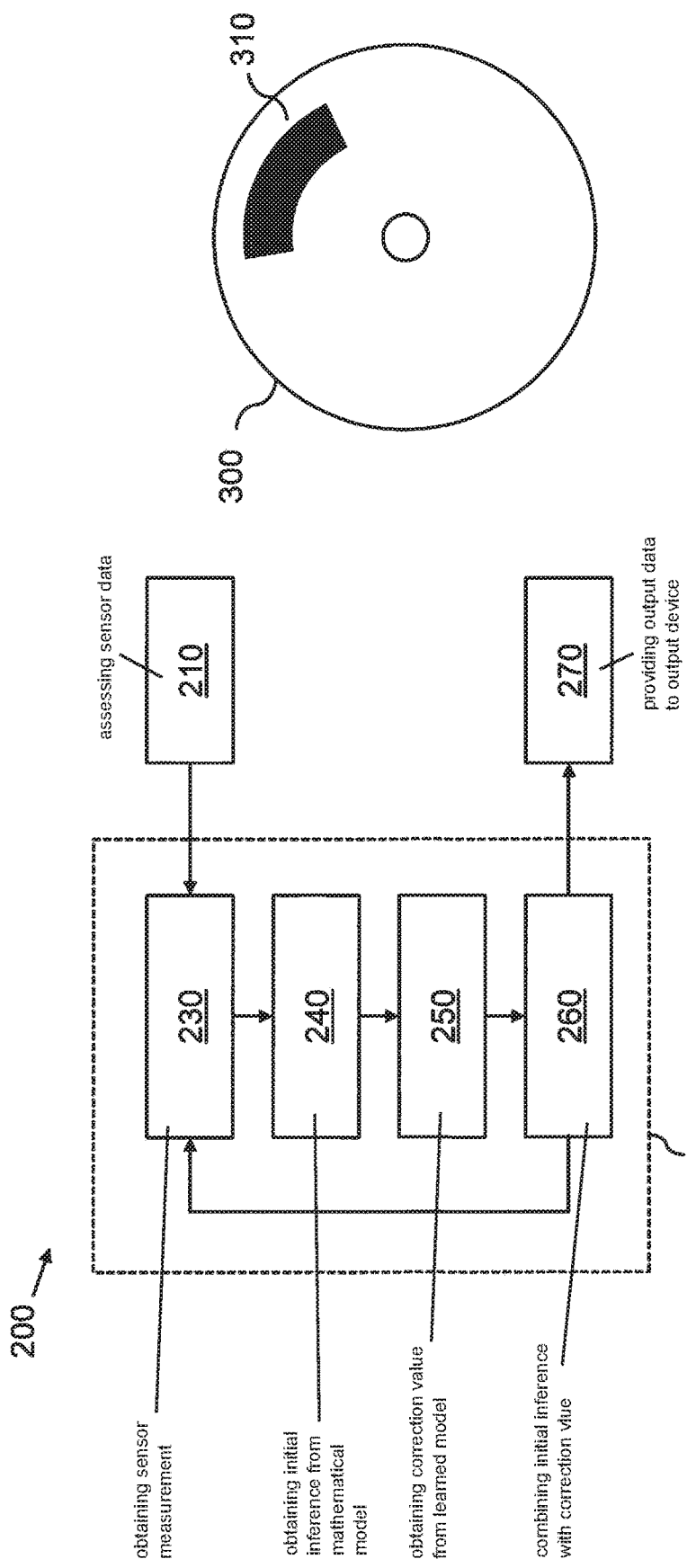

CONTROL OF A PHYSICAL SYSTEM BASED ON INFERRED STATE

CROSS REFERENCE

The present application claims the benefit under 35 U.S.C. § 119 of European Patent Application No. EP 19161069.0 filed on Mar. 6, 2019, which is expressly incorporated herein by reference in its entirety.

FIELD

The present invention relates to a system and computer-implemented method for enabling control of a physical system based on a state of the physical system which is inferred from sensor data. The present invention further relates to a computer-readable medium comprising data representing instructions arranged to cause a processor system to perform the computer-implemented method.

BACKGROUND INFORMATION

Conventionally, a physical system may be controlled based on a state of the physical system which is determined from sensor data. For example, the movement of an autonomous agent, such as a robot, car or drone, may be controlled based on a current location of the agent, with the current location being determined from location data obtained from a Global Positioning System (GPS) sensor or similar type of geolocation sensor. However, such location data does not represent the 'true' location of the agent but rather a sensor-based measurement, which may deviate from the true location due to uncertainty in the measurements, which is also simply referred to as 'noise' and which may be due to various reasons, e.g., in this example due to satellite signal blockage, multipath interference, radio interference, etc.

It is however desirable to be able to determine the true location of the agent as accurately as possible based on such potentially noisy sensor data. Similar examples of where it is desirable to determine a state of a physical system based on potentially noisy sensor data include heating systems for buildings (being an example of a physical system), in which it may be desirable to determine the temperature (being an example of a state) using sensor data obtained from a temperature sensor, or an electric motor (being another example of a physical system), in which it may be desirable to determine the rotor's position (being another example of a state) based on sensor data obtained from a position feedback sensor.

It will be appreciated that sensor measurements may be associated with a state, but typically represent measurements of an observable quantity while the state itself may be an unobservable quantity, e.g., for fundamental or practical reasons. For example, the temperature is typically measured indirectly, e.g., using a temperature sensor which measures changes in resistance, with these changes in resistance correlating to variations in temperature. Other examples of the sensor measurement only indirectly relating to a particular state of a physical system include, but are not limited, to the following: the orientation (being an example of a state) of a device may be determined from an accelerometer which measures so-called 'proper' acceleration, and the occupancy of a room (being another example of a state) may be determined from infrared measurements obtained in the room.

Conventionally, sensor data may be filtered to reduce noise in the sensor data, thereby allowing the state to be more accurately determined from such sensor data. For example, Kalman filtering may be used to recursively estimate a state of a physical system based on a time-series of sensor measurements.

Such Kalman filtering may incorporate prior knowledge about the relation between the sensor measurements and the state of the physical system. For example, a mathematical model may be used which represents a prior knowledge-based modelling of the state as a function of a sensor measurement and a previous inferred state. Such a mathematical model may for example incorporate the physical laws of motion to estimate a current location of a robot based on a previous location of the robot and geolocation measurements obtained from a GPS sensor in the robot.

SUMMARY

It may be desirable to enable control of a physical system based on a state of the physical system which is inferred from sensor data, in which the inference of the state is improved over Kalman filtering and similar techniques.

In accordance with a first aspect of the present invention, an example system for enabling control of a physical system is provided. In accordance with a further aspect of the present invention, an example computer-implemented method is provided for enabling control of a physical system. In accordance with a further aspect of the present invention, an example computer-readable medium is provided and an example computer-readable medium is provided.

The above measures provide an iterative inference of a state of a physical system based on sensor data which represents sensor measurements associated with the state of the physical system. The physical system may for example be a physical entity such as a vehicle, robot, etc., or a connected or distributed system of physical entities, e.g., a lighting system, or any other type of physical system, such as a building. The state may be time-varying quantity, e.g., a temperature, a speed, an acceleration, a position, a geolocation, an occupancy, etc., but also a set of such quantities, e.g., a vector of speed and acceleration.

The state may be inferred from sensor data which may be obtained from one or more sensors. The sensor(s) may be part of the physical system so as to be able to obtain sensor measurements which are associated with the state of the physical system, or may be arranged separate from the physical system if the sensor measurements may be obtained remotely. The sensor measurements pertain to quantities that allow the state to be inferred from the sensor measurements. As such, there exists a correlation between the measured quantity(s) and the quantity(s) representing the state to be inferred. Typically, the quantity representing the state to be inferred cannot be measured directly, e.g., for fundamental or practical reasons.

The above measures involve iteratively inferring the state of the physical system. For that purpose, in an iteration of the inference, a sensor measurement is obtained, after which an initial inference of the state is obtained using a mathematical model representing a prior knowledge-based modelling of the state. More specifically, the sensor measurement and the previous inferred state are used as input to the mathematical model, which then produces the initial inference of the state as output. The mathematical model may encode prior knowledge on the relation between the sensor measurement and the state to be inferred, with the model taking into account the previous inferred state. For example, the mathematical model may represent a physical modelling of the relation between the sensor measurement and the state to be inferred. In a specific example, if the state is a temperature to be measured and the quantity which is measured is the resistance of a material, the mathematical model may express the temperature as a function of the measured resistance and a previous inferred temperature. In generating the mathematical model, domain knowledge may be used, such as a temperature coefficient of resistance (TCR) of the material. In general, the mathematical model may be constructed at least in part based on manual specification, e.g., by a system designer, and expressed as one or a set of equations. Such types of mathematical models may be known per se from the fields of statistics and control systems.

The above measures further involve providing and applying a learned model to the initial inference of the state and the sensor measurement. The learned model, which may represent any suitable learned model such as a neural network, has been learned to minimize an error between initial inferences provided by the mathematical model and a ground truth. As output, a correction value is provided for correcting the initial inference of the state of the mathematical model. The state of the physical system to which the sensor measurement pertains is then obtained by combining the initial inference of the state provided by the mathematical model and the correction value provided by the learned model, for example by applying the correction value to the initial inference of the state by means of a simple addition.

The above measures have the effect that a mathematical model is used for obtaining an initial estimate of the state of the physical system, which is then corrected by a learned model which has been specifically learned to correct the initial inference of the mathematical model based on a ground truth.

Effectively, the prior knowledge-based modelling by the mathematical model may provide a coarse estimate of the state of the physical system, while the learned model may provide a refinement of the coarse estimate. Namely, the learning on the ground truth may have enabled the learned model to recognize unknown relations or correlations between the sensor measurement and the state to be inferred which have not been represented in the prior knowledge-based modelling by mathematical model.

Surprisingly, such a hybrid approach of using a prior knowledge-based ('non-learned') mathematical model and a learned model has been found to improve the accuracy of the inference of the state not only compared to the use of a prior knowledge-based modelling alone, but also compared to the use of a learned model which has been learned to directly infer the state of the physical system based on the sensor measurement. Namely, such 'directly' learned models may struggle to accurately model the dynamics of a physical system, e.g., due to an insufficient complexity of the learned model and/or due to insufficient availability of training data. Conversely, the learned model used in the above measures may be less complex and/or require less training data as the relation(s) between the sensor measurements and the state may have been already modelled to an approximate degree by the mathematical model. As such, the training may be limited to having to learn the typically smaller deviations in the initial inference from the ground truth.

Having inferred the state of the physical system based on the sensor measurements, output data may be provided to an output device which is used in the control of the physical system so as to enable the control of the physical system based on the inferred state. For example, the output device may be an actuator which is part of, or located in a vicinity of the physical system. The output data may be used to control the actuator, and thereby the physical system. In other examples, the output device may be a rendering device which is configured to generate a sensory perceptible output signal based on the inferred state. For example, the rendering device may be a display configured to display the output signal. Other types of sensory perceptible output signals include, but are not limited to, light signals, auditive signals, tactile signals, etc. Corresponding rendering devices are known per se. Based on the sensory perceptible output signal, an operator may then control the physical system. For example, the sensory perceptible output signal may denote a failure in a component of the physical system, which may prompt an operator to control the physical system by stopping or pausing its operation. In general, the sensory perceptible output signal may represent the inferred state, or may represent a result derived from the inferred state, e.g., a failure diagnosis.

Optionally, the processor subsystem is configured to iteratively infer the state of the physical system by using time-series of sensor measurements and previous inferred states. Effectively, instead of using only a previous sensor measurement and a previous inferred state, a respective time-series may be used as input to the mathematical model and the learned model. Each time-series may be limited in temporal extent, and may be represented by a sliding window which may, e.g., be implemented as a circular buffer. The use of such time-series may provide a more accurate inference of the state as the dynamics of the physical system may be better approximated by the mathematical model and/or such an approximation may be more accurately refined by the learned model.

Optionally, the learned model is a recurrent neural network (RNN), and the processor subsystem is configured to maintain and pass a hidden state of the recurrent neural network between iterations of the iterative inference of the state of the physical system. Such recurrent neural networks are well-suited as learned model when iteratively inferring the state of a physical system as such types of neural networks exhibit temporal dynamic behaviour, and therefore may be used to learn refinements to the approximation of a state of a dynamic physical system. For example, the learned model may be a graph neural network (GNN) comprising a gated recurrent unit (GRU) to establish recursion in the graph neural network.

Optionally, the mathematical model comprises a transitional model part which models a conditional probability of the state to be inferred given a previous inferred state, and a measurement model part which models a conditional probability of the sensor measurement given the state to be inferred. The mathematical model may thus be a probability-based model which models the state as at least two conditional probabilities: a first 'transitional' probability representing the conditional probability that the previous inferred state transitions to a current inferred state, and a second 'measurement' probability representing the conditional probability that the sensor measurement denotes a current inferred state. Such type of prior knowledge-based modelling is well-suited to be processed by mathematical estimation techniques such as Kalman Filtering, for example when assuming that probability distributions of the mathematical model are each linear and Gaussian.

It will be appreciated by those skilled in the art that two or more of the above-mentioned embodiments, implementations, and/or optional aspects of the present invention may be combined in any way deemed useful.

Modifications and variations of the computer-implemented method or any computer-readable medium, which correspond to the described modifications and variations of the system, can be carried out by a person skilled in the art on the basis of the present description, and vice versa.

BRIEF DESCRIPTION OF THE DRAWINGS

These and other aspects of the invention will be apparent from and elucidated further with reference to the embodiments described by way of example in the description below with reference to the figures.

FIG. 4 shows a method for enabling control of a physical system.

FIG. 5 shows a computer-readable medium comprising data.

It should be noted that the figures are purely diagrammatic and not drawn to scale. In the figures, elements which correspond to elements already described may have the same reference numerals.

LIST OF REFERENCE NUMBERS

Figure 1:
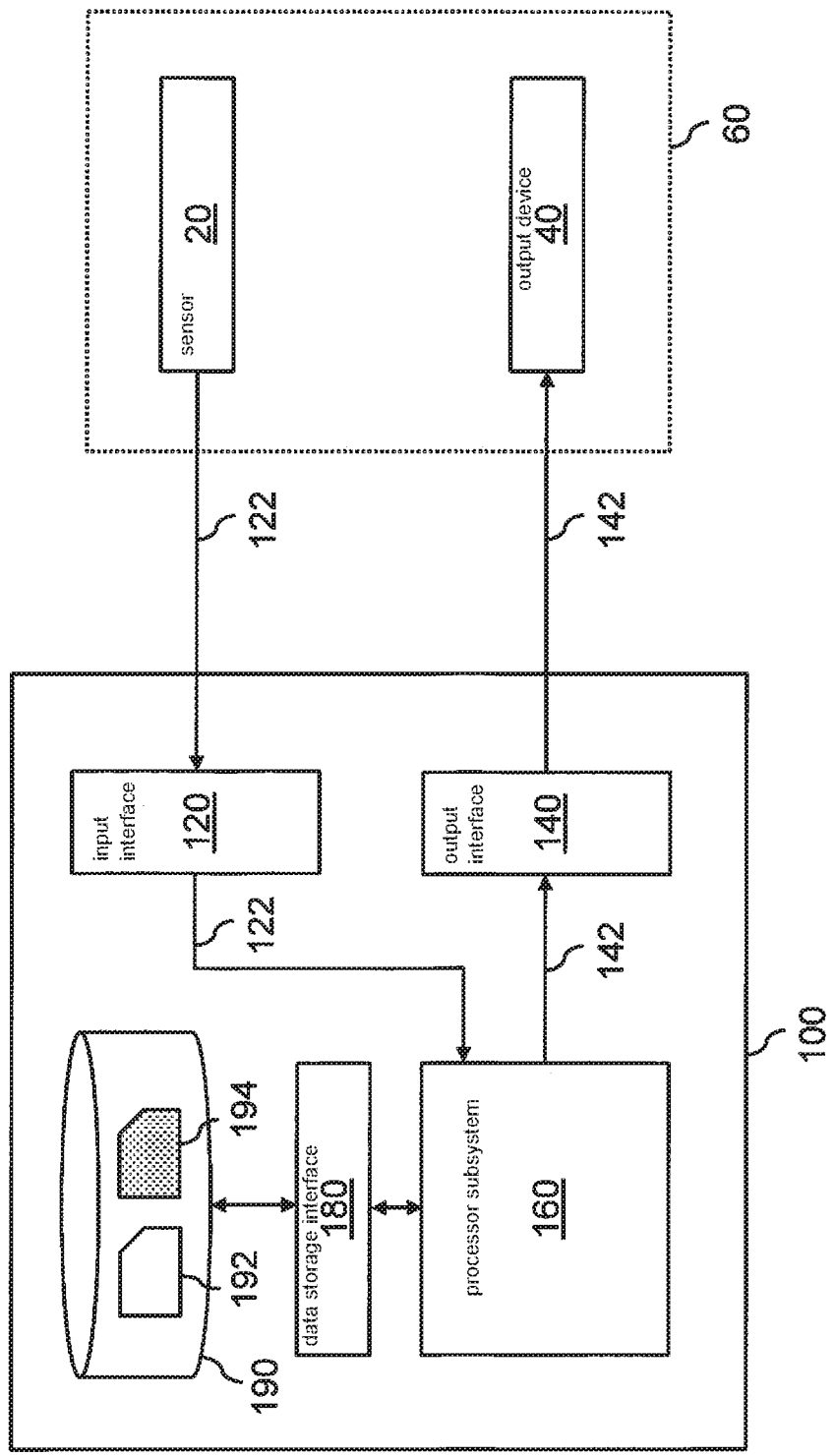
FIG. 1 shows a system for enabling control of a physical system, wherein the system is configured to iteratively infer a state of the physical system from sensor data obtained from a sensor and to provide output data to an output device associated with the control of the physical system, such as an actuator.

The following list of reference numbers is provided for facilitating understanding of the figures and shall not be construed as limiting the present invention.

20 sensor
40 output device
60 physical system
100 system for enabling control of physical system
120 input interface
122 sensor data
140 output interface
142 output data
160 processor subsystem
180 data storage interface
190 data storage
192 data representation of mathematical model
194 data representation of learned model
200 method for enabling control of physical system
210 accessing sensor data
220, 222 iteration of iterative inference
230 obtaining sensor measurement
240 obtaining initial inference from mathematical model
250 obtaining correction value from learned model
260 combining initial inference with correction value
270 providing output data to output device
300 computer-readable medium
310 non-transitory data

DETAILED DESCRIPTION OF EXAMPLE EMBODIMENTS

The following relates to a system and computer-implemented method for enabling control of a physical system based on a state of the physical system which is inferred from sensor data. Specific examples of such physical systems, states to be inferred and types of sensor data have been indicated in the summary section. The following elaborates on various aspects of the implementation of the system and computer-implemented method, and on the iterative inference itself.

FIG. 1 shows a system 100 for enabling control of a physical system based on a state of the physical system which is inferred from sensor data. FIG. 1 shows the physical system schematically as dashed outline 60, but in general, such a physical system may for example be a physical entity such as a vehicle, robot, etc., or a connected or distributed system of physical entities, e.g., a lighting system, or any other type of physical system, e.g., a building. The physical system 60 is shown to comprise a sensor 20 which may measure one or more quantities which correlate with a state of the physical system which is to be inferred. As shown in FIG. 1, the sensor 20 may be part of the physical system. In other examples, the sensor 20 may be arranged remotely from the physical system 60, for example if the quantity(s) can be measured remotely. For example, a camera-based sensor may be arranged outside of a robot but may nevertheless measure quantities associated with the robot, such as the robot's position and orientation within a workspace.

The system 100 is shown to comprise an input interface 120 which is shown to access sensor data 122 from the sensor 20. Effectively, the input interface 120 may represent a sensor interface. Alternatively, the input interface 120 may access the sensor data from elsewhere, e.g., from a data storage or a network location. Accordingly, the input interface 120 may have any suitable form, including but not limited to a low-level communication interface, e.g., based on I2C or SPI data communication, but also a data storage interface such as a memory interface or a persistent storage interface, or a personal, local or wide area network interface such as a Bluetooth, Zigbee or Wi-Fi interface or an ethernet or fibreoptic interface.

The system 100 is further shown to comprise an output interface 140 to provide output data 142 to an output device 40, which may for example be an actuator 40 which is part of the physical system 60. For example, the actuator may be an electric, hydraulic, pneumatic, thermal, magnetic and/or mechanical actuator. Specific yet non-limiting examples include electrical motors, electroactive polymers, hydraulic cylinders, piezoelectric actuators, pneumatic actuators, servomechanisms, solenoids, stepper motors, etc., etc. In another example, which is not shown in FIG. 1, the output device may be a rendering device, such as a display, a light source, a loudspeaker, a vibration motor, etc., etc, which may be used to generate a sensory perceptible output signal which may render the inferred state or a result derived from the inferred state, such as a failure diagnosis or any other type of derived result, e.g., for use in guidance, navigation or other type of control of the physical system.

The system 100 is further shown to comprise a processor subsystem 160 configured to iteratively infer the state of the physical system based on the sensor data 122 accessed via the input interface 120, and to provide output data 142 to the output device 40 to enable the control of the physical system 60 based on the inferred state. For that purpose, the processor subsystem 160 may be configured to, in an iteration of the inference, obtain a sensor measurement, obtain an initial inference of the state using a mathematical model representing a prior knowledge-based modelling of the state as a function of the sensor measurement and a previous inferred state, apply a learned model to the initial inference of the state and the sensor measurement, wherein the learned model has been learned to minimize an error between initial inferences provided by the mathematical model and a ground truth and to provide a correction value as output for correcting the initial inference of the state of the mathematical model, and obtain a current inferred state by combining the initial inference of the state with the correction value.

The system 100 is further shown to comprise a data storage interface 180 for accessing a data storage 190, which may be a volatile or non-volatile type of data storage, and which may be used to temporarily or persistently store data used by the processor subsystem 160, including but not limited to a data representation of the mathematical model 192 and a data representation of the learned model 194.

Figure 2:
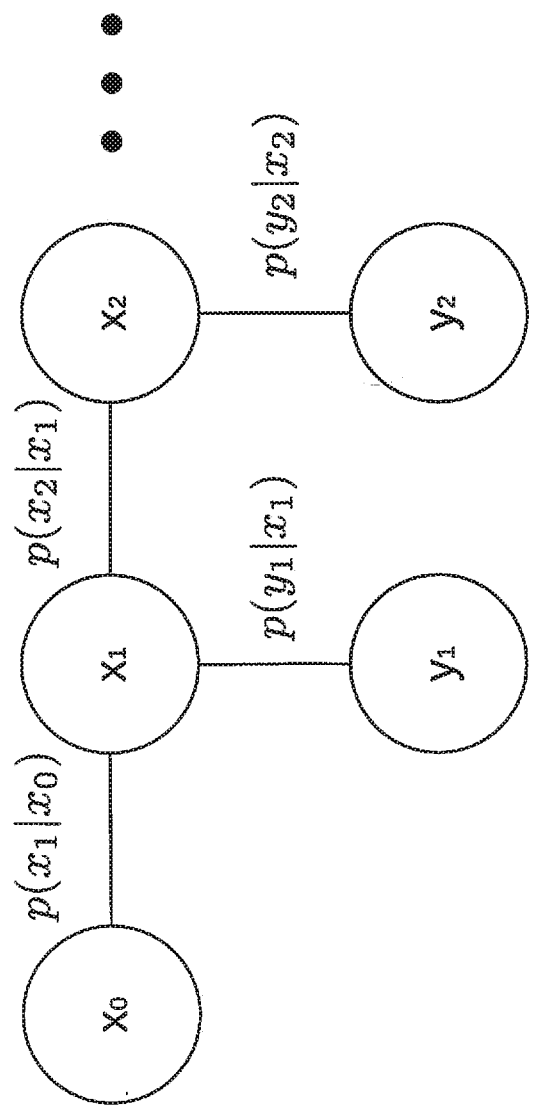
FIG. 2 illustrates a Hidden Markov Process.
Figure 3:
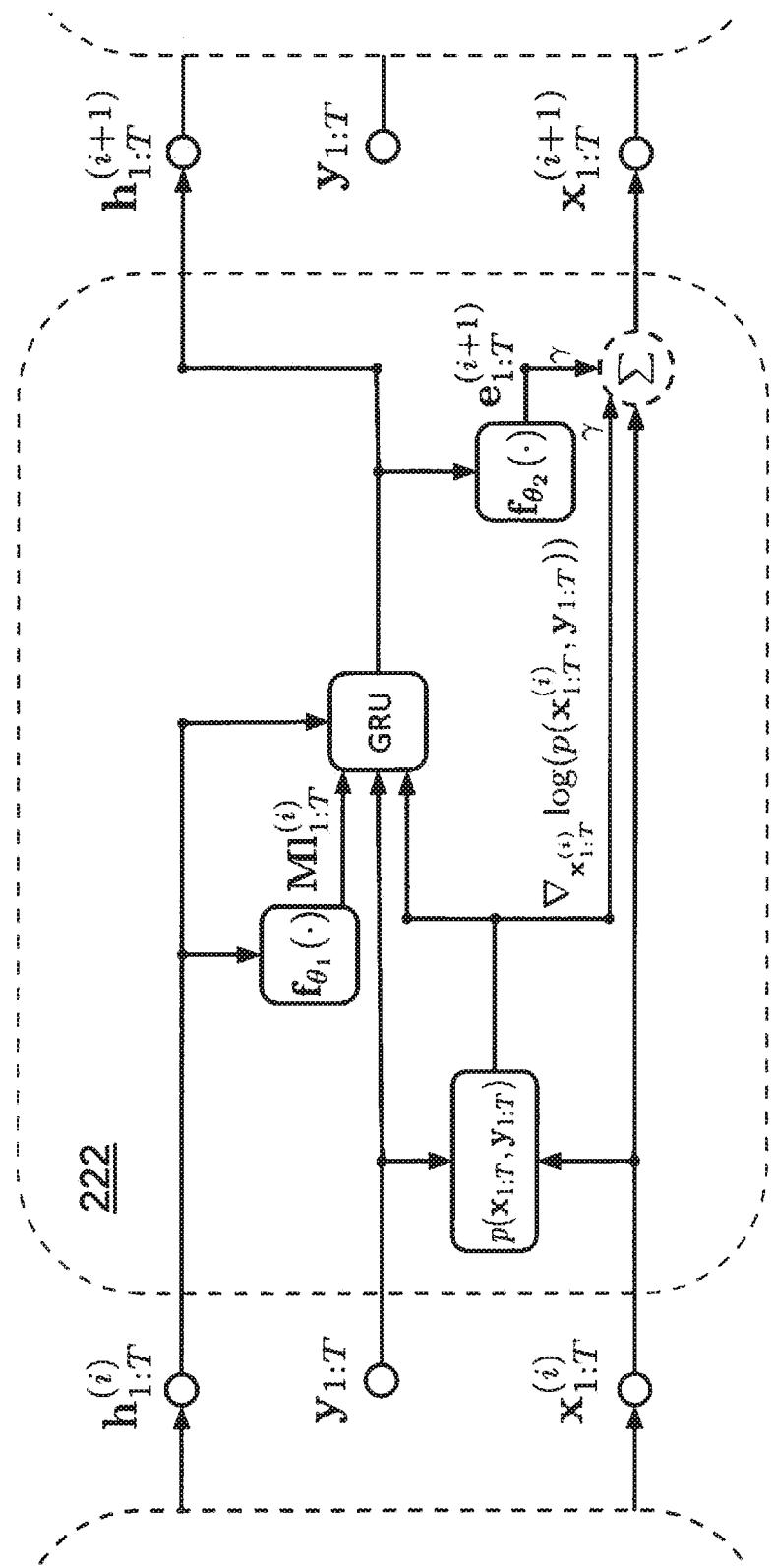
FIG. 3 illustrates an iteration of the iterative inference in an embodiment in which the inference is modelled as a message passing scheme.

Various details and aspects of the operation of the system 100, including optional aspects, will be further elucidated with reference to FIGS. 2 and 3.

In general, the system may be embodied as, or in, a single device or apparatus, such as a workstation or a server. The server may be an embedded server. The device or apparatus may comprise one or more microprocessors which execute appropriate software. For example, the processor subsystem may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the processor subsystem of the system may be implemented in the device or apparatus in the form of programmable logic, e.g., as a Field-Programmable Gate Array (FPGA). In general, each functional unit of the system may be implemented in the form of a circuit. The system may also be implemented in a distributed manner, e.g., involving different devices or apparatuses, such as distributed local or cloud-based servers. In some embodiments, the system may be part of the physical system itself, and/or may be represent a control system configured to control the physical system.

Various embodiments are possible for iteratively inferring the state of a physical system based on sensor data, while using in the iterative inference a 'hybrid' approach involving a prior knowledge-based ('non-learned') mathematical model and a learned model. The following example describes the iterative inference by modelling the iterative inference as a directed graphical model which uses an iterative message passing scheme over edges of the directed graphical model. It will be appreciated, however, that such a message passing scheme may serve to explain the iterative inference, but the actual implementation of the iterative inference may be carried out in various other ways, e.g., on the basis of analogous mathematical concepts. In particular, what is in the following referred to as 'prior knowledge messages' may represent a message passing-based representation of the mathematical model, while the 'learned messages' may represent a message passing-based representation of the learned model, as also discussed elsewhere.

Furthermore, in following example, a recurrent neural network is used as learned model, being in this example a graph neural network (GNN) comprising a gated recurrent unit (GRU) to establish recursion in the graph neural network. It will be appreciated, however, that other types of recurrent neural networks may be used as well, or in general any other type of learned model providing the functionality as described. The inference itself is based on the mathematical model comprising a transitional model part which models a conditional probability of the state to be inferred given a previous inferred state, and a measurement model part which models a conditional probability of the sensor measurement given the state to be inferred, and the probability distributions of the mathematical model being assumed to be linear and Gaussian. As such, the following may be considered a 'hybrid' approach to Kalman Filtering by incorporating a learned model as described.

As indicated above, the iterative inference may be modelled as a directed probabilistic graphical model (henceforth also simply referred to as 'generative model') using a message passing scheme where the nodes of the graphical model can send and receive messages to infer estimates of the states $x_{1:T}$. The following describes a hybrid approach, where messages derived from the generative graphical model are combined with learned messages, in short:

1. Prior Knowledge Messages: these messages may be derived from the generative graphical model (e.g., equations of motion from a physics model).

2. Learned Messages: These messages may be learned using a Graph Neural Network which may be trained to reduce the inference error on labelled data in combination with the Prior Knowledge Messages.

Hidden Markov Model

FIG. 2 illustrates, as background, a Hidden Markov Model, in which a set of unobservable variables $x_t$ may define the state of a process at every timestep $0<t<T$. The set of observable variables from which one may want to infer the process states are denoted by $y_t$. One may express $p(x_{1:T}|y_{1:T})$ as the probability distribution of the hidden states given the observations. It may be desirable to find which states $x_{1:T}$, maximize this probability distribution. More formally:

$$\hat{x}_{1:T} = \underset{x_{1:T}}{\operatorname{argmax}}\ p(x_{1:T}|y_{1:T}) \qquad (1)$$

Under the Markov assumption, these variables may follow a graphical model structure where i) the transition model may be described by the transition probability $p(x_t|x_{t-1})$, and ii) the measurement model may be described by $p(y_t|x_t)$. Both distributions may be stationary for all t. The resulting graphical model may be be expressed with the following equation:

$$p(x_{1:T}, y_{1:T}) = p(x_0)\prod_{t=1}^{T} p(x_t|x_{t-1})p(y_t|x_t) \qquad (2)$$

A conventional approach for inference problems in this graphical model is the Kalman Filter and Smoother. In Kalman Filters, both transition and measurement distributions are assumed to be linear and Gaussian: the prior knowledge one may have about the process may be encoded in linear transitions and measurement processes, and the uncertainty of the predictions with respect to the real system may be modelled by Gaussian noise:

$$x_t = Fx_{t-1} + q_t \qquad (3)$$

$$y_t = Hx_t + r_t \qquad (4)$$

Here $q_t, r_t$ may come from Gaussian distributions $q_t \sim \mathcal{N}(0,Q)$, $r_t \sim \mathcal{N}(0,R)$, with F, H being the linear transition and measurement functions respectively. If the process from which one may be inferring $x_{1:T}$ is actually Gaussian and linear, a Kalman Filter+Smoother with the right parameters (F,H,Q,R) will be able to infer the optimal state estimates. However, the real world is usually non-linear and complex, so assuming that a process is linear may be a strong limitation.

To model the complexities of the real world, these complexities may be learned from data (also referred to as 'ground truth' or 'training data') through learnable models such as neural networks. The following hybrid approach, which is also referred to as a Graphical Recurrent Inference Network (GRIN), combines knowledge from a generative model (e.g., physics equations) with a correction that is learned from training data using a neural network. Experiments have shown that this hybrid approach outperforms the prior knowledge-based methods and also the neural network methods for low and high data regimes, respectively. In other words, the hybrid approach benefits from the inductive bias in the limit of small data and also the high capacity of a neural networks in the limit of large data. The hybrid approach may gracefully interpolate between these different regimes Prior Knowledge Messages In order to define the prior knowledge messages, the approach of Putzky & Welling (https://arxiv.orq/abs/1706.04008) may be extended to the probabilistic graphical modelling framework from equation (2). This may be interpreted as an iterative optimization process to estimate the maximum likelihood values of the states $x_{1:T}$. The recursive update for each consecutive estimate of $x_{1:T}$ may be given by:

$$x_{1:T}^{(i+1)} = x_{1:T}^{(i)} + \gamma \nabla_{x_{1:T}^{(i)}} \log\left(p\left(x_{1:T}^{(i)}, y_{1:T}\right)\right) \quad (5)$$

Simplifying equation (5) for the hidden Markov process from equation (2) may yield three input messages for each inferred node $x_t$:

$$x_t^{(i+1)} = x_t^{(i)} + \gamma M p_t^{(i)} \quad (6)$$

$$Mp_t^{(i)} = m_{x_{t-1} \to x_t}^{(i)} + m_{x_{t+1} \to x_t}^{(i)} + m_{y_t \to x_t}^{(i)}$$

$$m_{x_{t-1} \to x_t}^{(i)} = \frac{\partial}{\partial x_t^{(i)}} \log\left(p\left(x_t^{(i)} \mid x_{t-1}^{(i)}\right)\right) \quad (7)$$

$$m_{x_{t+1} \to x_t}^{(i)} = \frac{\partial}{\partial x_t^{(i)}} \log\left(p\left(x_{t+1}^{(i)} \mid x_t^{(i)}\right)\right) \quad (8)$$

$$m_{y_t \to x_t}^{(i)} = \frac{\partial}{\partial x_t^{(i)}} \log\left(p\left(y_t \mid x_t^{(i)}\right)\right) \quad (9)$$

The three messages may be obtained by computing the three derivatives from equations (7), (8), (9). It is often assumed that the transition and measurement distributions $p(x_t|x_{t-1})$, $p(y_t|x_t)$ are linear and Gaussian, resulting in the Kalman Filter model. Next, the expressions for the prior knowledge messages may be provided when assuming these linear and Gaussian functions as in (3), (4):

$$m_{x_{t-1} \to x_t} = -Q^{-1}(x_t - F x_{t-1}) \quad (10)$$

$$m_{x_{t+1} \to x_t} = F^T Q^{-1}(x_{t+1} - F x_t) \quad (11)$$

$$m_{y_t \to x_t} = H^T R^{-1}(y_t - H x_t) \quad (12)$$

Adding Learned Messages

This section describes turning the model into a hybrid model or algorithm by adding a learned signal $e_t^{(i)}$ to the recursive operation, with FIG. 4 illustrating an inference iteration of the hybrid model. The resulting equation is:

$$x_t^{(i)} = x_t^{(i-1)} + \gamma (M p_t^{(i-1)} + e_t^{(i)}) \quad (13)$$

The signal $e_t^{(i)}$ may be structured as graph neural network (GNN) that aggregates information between nodes. For example, a gated recurrent unit (GRU) may be added to the message passing operation to make it recursive:

$$Ml_t^{(i-1)} = f_{\theta_1}(h_t^{(i-1)}, \{h_j^{(i-1)}\}_{j \in \mathcal{N}_t})$$

$$h_t^{(i)} = GRU_{\theta_3}([Mp_{a_t}^{(i-1)}, Ml_t^{(i-1)}, y_t], h_t^{(i-1)})$$

$$e_t^{(i)} = f_{\theta_2}(h_t^{(i)}) \quad (14)$$

For each time-step t one may keep track of a hidden state $h_t^{(i)}$ that represents a node of a directed chain graph. Two nodes ($h_t^{(i)}, h_{t+1}$) may be connected if they are consecutive in the temporal dimension t. The function $f_{\theta_1}(\cdot)$ may for example be a 2-layers Graph Neural Network that for each node, aggregates the neighborhood information into the message $Ml_t^{(i)}$. The GRU may receive at the input gate the message $Ml_t^{(i)}$, the concatenation of prior knowledge messages (7), (8), (9) that one may denote as $Mp_{a_t}^{(i-1)}$ and the observations $y_t$. From this inputted data, the $GRU_{\theta_3}$ may update the hidden state $h_t^{(i)}$. Finally, an MLP $f_{\theta_2}(\cdot)$ may map the hidden state $h_t^{(i)}$ to the correction signal $e_t^{(i)}$.

Equation (13) may thus represent a hybrid model or algorithm (also referred to as a GRIN (Graphical Recurrent Inference Network) model) in a simple recursive form where $x_t$ may be updated through two contributions: one that relies on previously known equations $Mp_t^{(i)}$ and another one, $e_t^{(i)}$, that is learned.

During training of the learned model, the loss function may be the MSE between the inferred states $x_{1:T}$, and the ground truth states $gt_{1:T}$. In order to provide early feedback, the loss function may be computed at every iteration with a weighted sum that emphasizes later iterations, $$w_i = \frac{i}{N},$$

more formally:

$$\text{Loss}(\Theta) = \sum_{i=1}^{N} w_i MSE(gt_{1:T} - x_{1:T}^{(i)}) \quad (15)$$

In some examples, the ground truth may only contain part of the inferred state $X_{1:T}$. For example, in some localization tasks the state may describe the position and velocity of a process while only the ground truth may be available for the position. In such situations, the loss may be computed with the part of the state that is comprised in the ground truth. The resulting loss may be the following:

$$\text{Loss}(\Theta) = \sum_{i=1}^{N} w_i MSE(gt_{1:T} - B x_{1:T}^{(i)}) \quad (16)$$

where B is a matrix whose rows are one-hot encoded vectors that select the components from $x_{1:T}$ contained in the ground truth.

The training of the learned model may comprise three main steps. First, each $x_t^{(0)}$ may be initialized to an initial value. In order to speed up the convergence, a value may be chosen that maximizes $p(y_t|x_t)$. For example, in a trajectory estimation context, the position values of $x_t$ may be set to the observed positions $y_t$. Second, the hyperparameters of the prior knowledge model may be tuned as it would be done with a Kalman Filter, which are usually the variance of the measurement and transition Gaussian distributions. Finally, the learned model may be trained using the above-mentioned loss function (15), (16).

In three different datasets for trajectory estimation, namely a linear synthetic dataset, a non-linear chaotic system (Lorenz attractor) and a real-world positioning system (Michigan NCLT dataset), the GRIN model has been found to efficiently combine prior knowledge messages with learned ones, outperforming either learned or graphical inference in isolation for different data regimes.

FIG. 4 shows a computer-implemented method 200 for enabling control of physical system based on a state of the physical system which is inferred from sensor data. The method 200 may correspond to an operation of the system as described with reference to FIG. 1 and elsewhere. However, this is not a limitation, in that the method may also be implemented by another system, apparatus or device.

The method 200 may comprise, in an operation titled "ACCESSING SENSOR DATA", using an input interface, accessing 210 sensor data representing sensor measurements associated with the state of the physical system. The method 200 may further comprise iteratively inferring the state of the physical system based on the sensor data by, in an iteration 220 of the iterative inference, in an operation titled "OBTAINING SENSOR MEASUREMENT" obtaining 230 a sensor measurement from the sensor data, in an operation titled "OBTAINING INITIAL INFERENCE FROM MATHEMATICAL MODEL" obtaining 240 an initial inference of the state using a mathematical model representing a prior knowledge-based modelling of the state as a function of the sensor measurement and a previous inferred state, in an operation titled "OBTAINING CORRECTION VALUE FROM LEARNED MODEL" applying 250 a learned model to the initial inference of the state and the sensor measurement, wherein the learned model has been learned to minimize an error between initial inferences provided by the mathematical model and a ground truth and to provide a correction value as output for correcting the initial inference of the state of the mathematical model, and in an operation titled "COMBINING INITIAL INFERENCE WITH CORRECTION VALUE" obtaining 260 a current inferred state by combining the initial inference of the state with the correction value. The method 200 may further comprise, in an operation titled "PROVIDING OUTPUT DATA TO OUTPUT DEVICE", using an output interface, providing 270 output data to an output device which is used in the control of the physical system to enable the control of the physical system based on the current inferred state. It will be appreciated that, in general, the operations of method 200 of FIG. 4 may be performed in any suitable order, e.g., consecutively, simultaneously, or a combination thereof, subject to, where applicable, a particular order being necessitated, e.g., by input/output relations between the respective operations.

The method may be implemented on a computer as a computer implemented method, as dedicated hardware, or as a combination of both. As also illustrated in FIG. 5, instructions for the computer, e.g., executable code, may be stored on a computer readable medium 300, e.g., in the form of a series 310 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 5 shows an optical disc 300. Alternatively, the computer readable medium 300 may comprise transitory or non-transitory data 310 representing a learned model as described elsewhere in this specification.

Examples, embodiments or optional features, whether indicated as non-limiting or not, are not to be understood as limiting the present invention.

It should be noted that the above-mentioned embodiments illustrate rather than limit the present invention, and that those skilled in the art will be able to design many alternative embodiments without departing from the scope of the present invention. Use of the verb "comprise" and its conjugations does not exclude the presence of elements or stages other than those stated. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The present invention may be implemented by hardware comprising several distinct elements, and by a suitably programmed computer. When means are enumerated, several of these means may be embodied by one and the same item of hardware. The mere fact that certain measures are separately described does not indicate that a combination of these measures cannot be used to advantage.

What is claimed is:
1. A physical system comprising:
a sensor;
an actuator; and
processing hardware;
wherein:
operation of the actuator is controlled by the processing hardware based on a state of the physical system which is inferred from sensor data;
the processing hardware includes:
an input interface configured for accessing the sensor data from the sensor and representing sensor measurements associated with the state of the physical system;
an output interface to the actuator via which the processing hardware performs the control of the operation of the actuator; and
a processor subsystem configured to use the sensor data by:
obtaining a sensor measurement from the sensor data accessed via the input interface;
applying the sensor measurement obtained from the accessed sensor data to a mathematical prior knowledge-based state model that identifies an initial inference of the state of the physical system that corresponds to the sensor measurement;
applying the initial inference of the state of the physical system identified by the model and the sensor measurement obtained from the accessed sensor data to a recurrent neural network that the processor subsystem executed and that has been learned to minimize an error between initial inferences identified by the mathematical prior knowledge-based state model and a ground truth and to provide a final inference of the state of the physical system; and performing the control of the operation of the actuator based on the final inference of the state of the physical system;

the execution, by the processor subsystem, of the recurrent neural network, to which the initial inference of the state of the physical system and the sensor measurement has been applied, includes performing an iterative refinement of the inference gradually from the initial inference of the state of the physical system to the final inference of the state of the physical system, the iterative refinement including performing a plurality of iterations that include:

a first iteration that operates on the sensor measurement applied to the mathematical prior knowledge-based model and on the initial inference of the state of the physical system obtained from the mathematical prior knowledge-based model;

a final iteration; and at least one intermediate iteration between the first iteration and the final iteration;

each of the at least one intermediate iteration obtains as input, and processes, the sensor measurement that had been applied to the mathematical prior knowledge-based model, a respective modified inference of the state of the physical system that had been output by an immediately preceding one of the iterations, and a respective hidden state of the recurrent network that had been output by the immediately preceding one of the iterations, the processing by the respective intermediate iteration producing:

a further hidden state; and a further modified inference of the state of the physical system by generating a correction value as a function of the input sensor measurement, the input respective modified inference of the state of the physical system, and the input respective hidden state and then modifying the input respective modified inference of the state of the physical system by the correction value; and the final iteration obtains as input, and processes, the sensor measurement that had been applied to the mathematical prior knowledge-based model, the further modified inference of the state of the physical system that had been produced by an immediately preceding one of the at least one intermediate iteration, and the further hidden state that had been produced by the immediately preceding one of the at least one intermediate iteration, the processing by the final iteration producing the final inference of the state of the physical system by generating a further correction value as a function of the input sensor measurement, the input further modified inference of the state of the physical system, and the further hidden state that had been produced by the immediately preceding one of the at least one intermediate iteration, and then modifying the input further modified inference of the state of the physical system by the further correction value.

2. The system according to claim 1, wherein the processor subsystem is configured to:

using the input interface, obtain a time-series of sensor measurements;

obtain the initial inference of the state by using the time-series of sensor measurements and a time-series of previous inferred states as input to the mathematical prior knowledge-based state model;

apply the recurrent neural network to the initial inference of the state and the time-series of sensor measurements to obtain a time-series of correction values; and obtain the final inference of the state by combining the initial inference of the state with the time-series of correction values.

3. The system according to claim 1, wherein the recurrent neural network includes a gated recurrent unit to establish recursion in the recurrent neural network.

4. The system according to claim 1, wherein the mathematical prior knowledge-based state model provides a physics-based modelling of the state as a function of the sensor measurement and a previous inferred state.

5. The system according to claim 1, wherein the mathematical prior knowledge-based state model includes a transitional model part which models a conditional probability of the state to be inferred given a previous inferred state, and a measurement model part which models a conditional probability of the sensor measurement given the state to be inferred.

6. The system according to claim 5, wherein the processor subsystem is configured to iteratively infer the state by Kalman Filtering by assuming that probability distributions of the mathematical prior knowledge-based state model are linear and Gaussian.

7. The system according to claim 1, wherein the actuator is a vehicle actuator or a robotics actuator.

8. The system according to claim 1, wherein the system is configured to cause a sensory perceptible warning signal to be generated when the final inference of the state of the physical system indicates a failure of the physical system.

9. A method of a physical system that includes a sensor, an actuator, and processing hardware in which operation of the actuator is controlled by the processing hardware based on a state of the physical system which is inferred from sensor data, the method comprising the following steps:

using an input interface of the processing hardware, accessing the sensor data from the sensor and representing sensor measurements associated with the state of the physical system;

performing the following, by a processor subsystem of the processing hardware, using the sensor data:

obtaining a sensor measurement from the sensor data from the sensor accessed via the input interface;

applying the sensor measurement obtained from the accessed sensor data to a mathematical prior knowledge-based model that identifies an initial inference of the state of the physical system that corresponds to the sensor measurement;

applying the initial inference of the state of the physical system identified by the model and the sensor measurement obtained from the accessed sensor data to a recurrent neural network that is executed by the processor subsystem and that has been learned to minimize an error between initial inferences identified by the mathematical prior knowledge-based state model and a ground truth and to provide a final inference of the state of the physical system; and performing the control of the operation of the actuator based on the final inference of the physical system;

wherein:

the execution, by the processor system of the recurrent neural network, to which the initial inference of the state of the physical system and the sensor measurement has been applied, includes performing an iterative refinement of the inference gradually from the initial inference of the state of the physical system to the final inference of the state of the physical system, the iterative refinement including performing a plurality of iterations that include:
  a first iteration that operates on the sensor measurement applied to the mathematical prior knowledge-based model and on the initial inference of the state of the physical system obtained from the mathematical prior knowledge-based model;
  a final iteration; and
  at least one intermediate iteration between the first iteration and the final iteration;
each of the at least one intermediate iteration obtains as input, and processes, the sensor measurement that had been applied to the mathematical prior knowledge-based model, a respective modified inference of the state of the physical system that had been output by an immediately preceding one of the iterations, and a respective hidden state of the recurrent neural network that had been output by the immediately preceding one of the iterations, the processing by the respective intermediate iteration producing:
  a further hidden state; and
  a further modified inference of the state of the physical system by generating a correction value as a function of the input sensor measurement, the input respective modified inference of the state of the physical system, and the input respective hidden state and then modifying the input respective modified inference of the state of the physical system by the correction value; and
the final iteration obtains as input, and processes, the sensor measurement that had been applied to the mathematical prior knowledge-based model, the further modified inference of the state of the physical system that had been produced by an immediately preceding one of the at least one intermediate iteration, and the further hidden state that had been produced by the immediately preceding one of the at least one intermediate iteration, the processing by the final iteration producing the final inference of the state of the physical system by generating a further correction value as a function of the input sensor measurement, the input further modified inference of the state of the physical system, and the further hidden state that had been produced by the immediately preceding one of the at least one intermediate iteration, and then modifying the input further modified inference of the state of the physical system by the further correction value.

* * * * *